(12) United States Patent
Headley

(10) Patent No.: US 7,389,797 B1
(45) Date of Patent: Jun. 24, 2008

(54) AIR HEADER/MANIFOLD FOR A DUST COLLECTOR

(76) Inventor: J. Tyler Headley, Royal United - 1826 Roberts St., Winchester, VA (US) 22601

( * ) Notice: Subject to any disclaimer, the term of this patent is extended or adjusted under 35 U.S.C. 154(b) by 301 days.

(21) Appl. No.: 11/367,451

(22) Filed: Mar. 6, 2006

Related U.S. Application Data

(60) Provisional application No. 60/658,366, filed on Mar. 4, 2005.

(51) Int. Cl.
*B01D 46/00* (2006.01)
(52) U.S. Cl. .................................... 137/883; 55/341.1
(58) Field of Classification Search ................ 137/883; 55/284, 302, 341.1
See application file for complete search history.

(56) References Cited

U.S. PATENT DOCUMENTS

| | | | | |
|---|---|---|---|---|
| 3,499,464 | A * | 3/1970 | Williams et al. | 137/883 |
| 3,709,248 | A * | 1/1973 | Aurich et al. | 137/883 |
| 4,553,925 | A * | 11/1985 | Bricmont | 137/883 |
| 6,302,931 | B1 * | 10/2001 | Min | 55/302 |
| 6,350,290 | B1 * | 2/2002 | Nadeau | 55/302 |
| 6,363,971 | B1 * | 4/2002 | Kaylan et al. | 137/883 |
| 6,817,380 | B2 * | 11/2004 | Gagnon | 137/883 |

\* cited by examiner

*Primary Examiner*—John Fox
(74) *Attorney, Agent, or Firm*—William H Holt

(57) ABSTRACT

Air header/manifolds for industrial air filters, sometimes referred to as bag houses, are formed by extrusion and provided with flat mounting and sealing surfaces for accommodating staggered and offset rows of valves secured to the mounting surface and provided with blow pipes extending from the valves through the manifold and through the lower sealing surface.

7 Claims, 1 Drawing Sheet

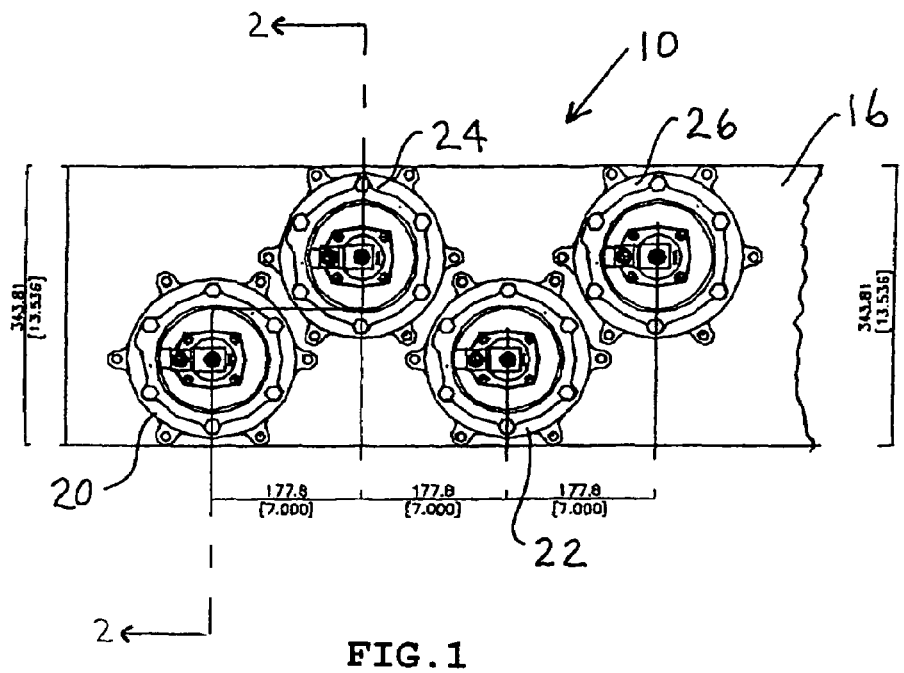
FIG.1
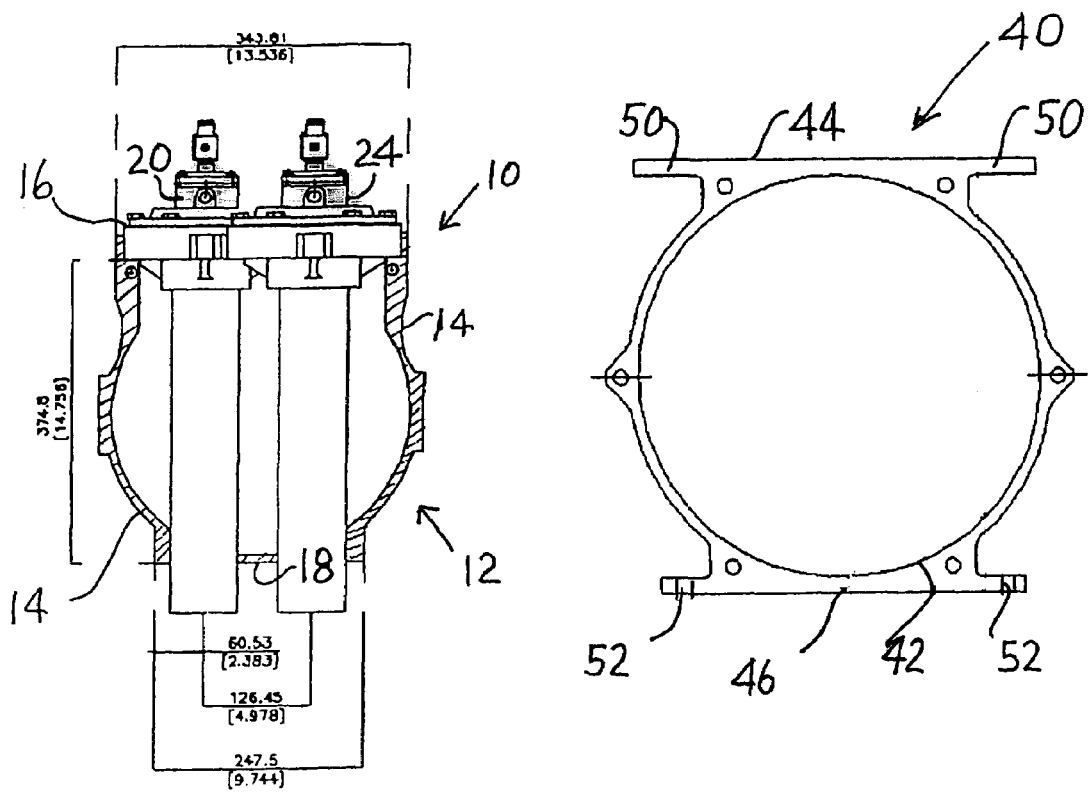
FIG.2
FIG.3

AIR HEADER/MANIFOLD FOR A DUST COLLECTOR

RELATED APPLICATION

Benefit is claimed under Title 35, United States Code Section 119(e), of U.S. Provisional Application Ser. No. 60/658,366, filed on Mar. 4, 2005.

BACKGROUND OF THE INVENTION

The invention relates to the field of dust collectors of the type containing a plurality of filter bags and more particularly to headers or manifolds for providing high pressure air for periodically cleaning the filter bags by producing pulses of air for expelling accumulated dust from the filter bags, as is well known in the prior art. Variations of typical apparatus are shown in U.S. Pat. No. 6,302,931, granted on Oct. 16, 2001.

Currently, essentially all of the larger bag house systems being installed in the United States include air header/manifolds which utilize 14 inch diameter steel pipe and include pulse valves that have a footprint of approximately 8½ inches. About half of Original Equipment Manufacturers (OEM's) typically construct their bag arrangements with a 7 inch spacing between bag centers which results in added expense in arranging the valves because the 8½ inch footprint cannot be easily accommodated.

SUMMARY OF THE INVENTION

A feature of the invention is the substitution of an air header/manifold in the shape of a tank for containing compressed air and formed from extruded aluminum, rather than a circular steel pipe commonly used in the prior art. The improved manifold is formed with an upper surface that is flat and has sufficient width to accommodate, for example, eight inch valves staggered on 7 inch centers, thereby corresponding to the typical 7 inch spacing of the filter bags. Further, the air pipes exiting from the manifold have a smaller footprint than the valves with the result that the lower portion of the manifold enclosing the air pipes is made narrower than the portion mounting the valves, thereby reducing the amount of metal used in the construction of the manifold, with a corresponding reduction in weight and costs.

BRIEF DESCRIPTION OF THE DRAWINGS

FIG. 1 is a plan view of an air header/manifold illustrating a plurality of rows of valves offset from each other.

FIG. 2 is a sectional view taken on line 2-2 of FIG. 1

FIG. 3 illustrates a modified air header/manifold wherein the tank portion has a circular cross section provided with a flat upper surface and a narrower lower surface.

DESCRIPTION OF THE PREFERRED EMBODIMENTS

Referring to FIGS. 1 and 2, an air header/manifold, generally indicated by the numeral 10, includes an extruded housing 12 preferably formed of aluminum and including side walls 14, a generally flat, top wall 16 and a bottom wall 18 which is of narrower width than top wall 16.

A plurality of valves 20, 22, 24 and 26 are mounted on top wall 16, extending along the length, from left to right, of manifold 10 as best shown in FIG. 1. A first row of valves, comprised of valves 20 and 22, is offset from a second row of valves, comprised of valves 24 and 26 resulting in a shorter length for manifold 10 while still accommodating a spacing of, as shown, seven inches on center. This offset and staggered arrangement of the plurality of valves solves the problems of the prior art, as alluded to above, regarding the expense involved in arranging eight inch valves on seven inch centers. While only four valves are shown in FIG. 1 it is to be understood that the length of the extruded manifold can be extended to accommodate as many additional valves as needed.

As best shown in FIG. 2, the dimensions for the disclosed model of air header/manifold 10 show that the top wall 16 has a width of 13.5+ inches while the bottom wall 18 has a width of only 9.74+ inches. These dimensions accommodate a series of individual blow pipes for each of the valves as shown by blow pipes 21 and 25 depending from valves 20 and 24. Thus, it is clear that this extrusion provides for a reduction in metal content, and a resulting reduction in weight and cost of manufacture, as compared to the prior art constructions.

In FIG. 3 an air header/manifold, generally indicated by the numeral 40, includes a generally circular tank portion 42 formed of extruded aluminum and including a generally flat, top wall 44 and a bottom wall 46 which is of narrower width than top wall 44. In the same manner as is shown in FIGS. 1 and 2, the manifold 40 is provided along its length with a plurality of rows of valves, comparable to valves 20, 22, 24 and 26, which are staggered and offset as in FIG. 1. Likewise, each valve is provided with an individual blow pipe comparable to blow pipes 21 and 25, as shown in FIG. 2.

Top wall 44 extends along the length of manifold 40 and includes outwardly extending wings or ears 50 for providing an enlarged mounting surface for the rows of valves. Bottom wall 46 extends along the length of manifold 40 and includes openings (not shown) for accommodating the plurality of blow pipes extending through the manifold and outwardly through the flat bottom wall 46 and includes outwardly extending wings or ears 52 for accommodating attachment of the manifold 40 to a dust collector.

In view of the foregoing, the present invention provides improvements over the prior art, namely, the reduction in expense of arranging the valves, the reduction in metal content, and related weight and costs. It is to be understood that the specific dimensions used in the above example are for purposes of illustration only and that various modifications of the invention may be made within the scope of the following claimed subject matter.

The invention claimed is:

1. An air header for an industrial air filter, said air header including a generally flat surface which comprises means for mounting a first row of valves and a second row of valves extending longitudinally along a length of said surface, said first row of valves being offset laterally and longitudinally staggered from said second row of valves.

2. An air header as defined in claim 1 wherein said air header is comprised of extruded aluminum.

3. An air header as defined in claim 2 wherein said generally flat surface comprises an upper surface of said header; said header being provided with a lower surface wherein said lower surface is narrower in width than said upper surface.

4. An air header as defined in claim 1 wherein said generally flat surface comprises an upper surface of said header; said header being provided with a lower surface wherein said lower surface is narrower in width than said upper surface.

5. An air header as defined in claim 1 wherein said air header has a central portion that is generally circular in cross-section.

6. An air header as defined in claim 5 wherein said air header is comprised of extruded aluminum.

7. An air header as defined in claim 6 wherein said generally flat surface comprises an upper surface of said header; said header being provided with a lower surface wherein said lower surface is narrower in width than said upper surface.

* * * * *